(12) United States Patent
Ivanov et al.

(10) Patent No.: US 8,778,226 B2
(45) Date of Patent: Jul. 15, 2014

(54) LUMINESCENT SYSTEMS BASED ON THE ISOLATION OF CONJUGATED PI SYSTEMS AND EDGE CHARGE COMPENSATION WITH POLAR MOLECULES ON A CHARGED NANOSTRUCTURED SURFACE

(75) Inventors: Ilia N. Ivanov, Knoxville, TN (US); Alexander A. Puretzky, Knoxville, TN (US); Bin Zhao, Oak Ridge, TN (US); David B. Geohegan, Knoxville, TN (US); David J. Styers-Barnett, Indianapolis, IN (US); Hui Hu, Oak Ridge, TN (US)

(73) Assignee: UT-Battelle, LLC

( * ) Notice: Subject to any disclaimer, the term of this patent is extended or adjusted under 35 U.S.C. 154(b) by 313 days.

(21) Appl. No.: 12/895,226

(22) Filed: Sep. 30, 2010

(65) Prior Publication Data
US 2012/0080646 A1    Apr. 5, 2012

(51) Int. Cl.
   *C09K 11/02*    (2006.01)
   *C09K 11/06*    (2006.01)
   *C09K 11/65*    (2006.01)

(52) U.S. Cl.
USPC ............. 252/301.4 R; 252/301.4 F; 977/746; 977/755; 977/738; 977/776; 977/834; 977/950; 428/917

(58) Field of Classification Search
USPC ............. 252/301.4 R, 301.4 F; 977/746, 755, 977/738, 776, 834, 950; 428/917
See application file for complete search history.

(56) References Cited

U.S. PATENT DOCUMENTS

| | | | |
|---|---|---|---|
| 6,203,814 B1 | 3/2001 | Fisher et al. | |
| 7,241,496 B2 | 7/2007 | Chen et al. | |
| 7,344,691 B2 | 3/2008 | Chen et al. | |
| 7,867,468 B1 * | 1/2011 | Haddon et al. | 423/447.1 |
| 2006/0210466 A1 | 9/2006 | Mitra et al. | |
| 2006/0249711 A1 | 11/2006 | Niu et al. | |
| 2007/0062411 A1 | 3/2007 | Weisman et al. | |
| 2008/0160384 A1 | 7/2008 | Iqbal et al. | |

FOREIGN PATENT DOCUMENTS

| | | | |
|---|---|---|---|
| WO | WO 02/095099 A1 | | 11/2002 |
| WO | WO 2007/050984 | * | 5/2007 |
| WO | WO 2007/050984 A2 | | 5/2007 |

OTHER PUBLICATIONS

Peng et al, "Sidewall Carboxylic Acid Functionalization of Single-Walled Carbon Nanotubes", J. Am. Chem. Soc., 2003, 125, pp. 15174-15182.*
Sun et al, "Quantum-Sized Carbon Dots for Bright and Colorful Photoluminescence", J. Am. Chem. Soc. May 2006, 128, pp. 7756-7757.*

(Continued)

*Primary Examiner* — Carol M Koslow
(74) *Attorney, Agent, or Firm* — Brinks Gilson & Lione

(57) ABSTRACT

A photoluminescent or electroluminescent system and method of making a non-luminescent nanostructured material into such a luminescent system is presented. The method of preparing the luminescent system, generally, comprises the steps of modifying the surface of a nanostructured material to create isolated regions to act as luminescent centers and to create a charge imbalance on the surface; applying more than one polar molecule to the charged surface of the nanostructured material; and orienting the polar molecules to compensate for the charge imbalance on the surface of the nanostructured material. The compensation of the surface charge imbalance by the polar molecules allows the isolated regions to exhibit luminescence.

21 Claims, 16 Drawing Sheets

(56) References Cited

OTHER PUBLICATIONS

Niu et al, "A highly selective chemical gas sensor based on functionalization of multi-walled carbon nanotubes with poly(ethylene glycol)", Sensors and Actuators B 126, Mar. 3007, pp. 361-367.*

Hu et al, "Synthesis and luminescence of nanodiamonds from carbon black", Material Science and Engineering B, 157, Feb. 2009, pp. 11-14.*

International Search Report of PCT/US2011/053848, mailed Nov. 29, 2011, 5 pages.

Ya-Ping Sun et al: "Quantum-Sized Carbon Dots for Bright and Colorful Photoluminescence," Journal of the American Chemical Society, vol. 128, No. 24, Jun. 1, 2006, pp. 7756-7757, XP55011804, ISSN: 0002-7863, DOI: 10.1021/ja062677d.

Riggs Jason E et al: "Strong Luminescence of Solubilized Carbon Nanotubes," Journal of the American Chemical Society, American Chemical Society, Washington, DC, vol. 122, No. 24, Jan. 1, 2000, pp. 5879-5880, XP002971878, ISSN: 0002-7863, DOI: 10.1021/JA9942282.

Zakharko Yu et al: "Influence of the Interfacial Chemical Environment on the Luminescene of 3C-SiC Nanoparticles," Journal of Applied Physics, American Institute of Physics, New York, US, vol. 107, No. 1, Jan. 4, 2010, pp. 13503-13503, XP012132473, ISSN: 0021-8979, DOI: 10.1063/1.3273498.

Hu S et al: "Synthesis and Luminescence of Nanodiamonds from Carbon Black," Materials Science and Engineering B, Elsevier Sequoia, Lausanne, CH, vol. 157, No. 1-3, Feb. 15, 2009, pp. 11-14, XP025940588, ISSN: 0921-5107, DOI: 10.1016/J.MSE8.2008.12.001.

Noriaki Sano, article entitled "Low-cost synthesis of single-walled carbon nanohorns using the arc in water method with gas injection," Journal of Physics D: Applied Physics, vol. 37, No. 8, 2004, pp. L17-L20.

Geon-Woong Lee et al., article entitled "Structural characterization of carboxylated multi-walled carbon nanotubes," Thin Solid Films, No. 516, 2008, pp. 5781-5784.

David B. Geohegan et al., article entitled "IV.C.1g Synthesis and Processing of Single-Walled Carbon Nanohorns for Hydrogen Storage and Catalyst Supports," DOE Hydrogen Program, FY 2006 Annual Progress Report, 2006, pp. 473-475.

David B, Geohegan et al., article entitled "Single-Walled Carbon Nanohorns: Novel Materials for Hydrogen Storage and Catalyst Supports," Oak Ridge National Laboratory Fact Sheet, 2007, pp. 1-2.

Carla Cioffi et al., article entitled "Functionalisation of carbon nanohorns," The Royal Society of Chemistry, 2006, pp. 2129-2131.

Haiqing Peng et al., article entitled "Sidewalls Carboxylic Acid Functionalization of Single-Walled Carbon Nanotubes," Journal of the American Chemical Society, 2003, vol. 125, No. 49, pp. 15174-15182, abstract only.

* cited by examiner

LUMINESCENT SYSTEMS BASED ON THE ISOLATION OF CONJUGATED PI SYSTEMS AND EDGE CHARGE COMPENSATION WITH POLAR MOLECULES ON A CHARGED NANOSTRUCTURED SURFACE

FEDERALLY SPONSORED RESEARCH AND DEVELOPMENT

The United States Government has rights in this invention pursuant to contract no. DE-AC05-00OR22725 between the United States Department of Energy and UT-Battelle, LLC.

FIELD

This disclosure relates generally to photoluminescent and electroluminescent materials. More specifically, this disclosure pertains to nanostructured material compositions and methods for making such materials exhibit visible luminescence.

BACKGROUND

Photoluminescence represents a mechanism by which a material absorbs electromagnetic energy in the UV-Vis-NIR spectral region at one wavelength, followed by the subsequent emission of a portion of this energy at a different, usually longer wavelength. On the other hand, electroluminescence relies upon the absorption of electrical energy by a material, followed by the emission of visible light. In essence, the absorption of light or electrical energy causes the molecules in the material to typically undergo an electronic transition from typically a ground state to an excited state. Relaxation of the excited-state molecules back to their ground state occurs with the simultaneous emission of light from the material.

The length of time (e.g., delay) between the absorption and emission of light by the material leads to the distinction between the photoluminescence phenomena known as fluorescence and phosphorescence. Typically, the delay time associated with fluorescence is relatively short being on the order of only $10^{-12}$ to $10^{-7}$ seconds, while the delay for phosphorescence is much longer. In fact, phosphorescent pigments are known to "glow in the dark" releasing the absorbed light over minutes or hours after the light source has been removed.

The occurrence of luminescence can continue to occur with a given photoluminescent or electroluminescent material as long as the external light source or electrical energy is present. If the exciting radiation or energy is stopped, then the occurrence of luminescence will cease. The luminescent effect associated with a material is highly dependent upon the selection of the pigments or luminescent centers in the material, the light absorption properties of the luminescent centers, and the intensity of the light absorbed.

Photoluminescent and electroluminescent materials may be incorporated into a variety of different products and have found use as biological markers for cell imaging, in exit signs and other egress or safety signage, in sensors, for drug delivery, and in optoelectronics, as well as in energy conversion devices. Photoluminescence can be used to track the position of a chemical within the human body and trigger various mechanisms of drug release; such mechanisms including, but not be limited to, microwave, thermal, or photochemical mediated mechanisms. Thus luminescent materials can exhibit multifunctional properties.

New applications and market areas for photoluminescent and electroluminescent materials and devices are continually emerging. Accordingly, there exists a continual desire to develop new materials that are nontoxic, cost effective to manufacture and that exhibit a strong luminescent effect over an extended lifetime. Especially useful is the development of new nontoxic, photoluminescent materials that can be used to deliver a chemical or drug within the human body and electroluminescent materials for optoelectronic displays.

SUMMARY

The present disclosure provides a method of making non-luminescent nanostructured particles into a luminescent system. One aspect of this method for preparing a photoluminescent or electroluminescent system, generally, comprises the steps of providing a nanostructured material followed by modifying the surface of the material to create isolated regions that will act as luminescent centers. However, the creation of these isolated regions also generates a charge imbalance on the surface of the nanostructured material which inhibits the luminescent centers from exhibiting luminescent behavior. The application of one or more polar molecules to the charged surface of the nanostructured material results in the compensation or neutralization of the surface charge imbalance. Upon the compensation of the surface charge imbalance, the isolated regions can exhibit luminescent behavior.

The formation of the isolated regions and the charge imbalance on the surface of the nanostructured material may be accomplished by acid etching the surface or functionalizing the surface of the nanostructured material with charged groups. Preferably, these charged groups are carboxylic acid (—COOH) moieties, hydroxyl or alcohol (—OH) moieties, or carbonyl (—C=O) moieties, but may also be a result of the interaction between a carbene or carbyne with the solvent. The application of polar molecules, such as dispersants and surfactants, to the charged surface may be done by immersing the nanostructured particles into a liquid solution comprising the polar molecules, by applying the polar molecules as part of a coating to the surface of the nanoparticles, or by any other method known to one skilled-in-the-art. Preferably, the polar molecules are selected as one from the group of polyethylene glycol (PEG), polyethyleneimine (PEI), and sodium dodecyl sulfate (SDS).

Another aspect of the present disclosure is to provide a luminescent system for use in biological markers, sensors, drug delivery, optoelectronic light emitting displays and sensing elements, or energy conversion devices. This photoluminescent or electroluminescent system generally comprises a nanostructured material dispersed in a rigid inorganic matrix, a liquid solution, a gel, or a polymer matrix having a charged surface and one or more polar molecules coupled to the charged surface. The polar molecules are oriented in a predetermined manner with respect to the surface of the nanostructured material and are positioned such that they compensate for the charge on the surface. It is this compensation of the charge(s) on the nanostructured material's surface that induces, protects, or isolates the luminescent center or region on the dispersed nanostructured material from relaxation via a non-radiative (thermal) process.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1A:
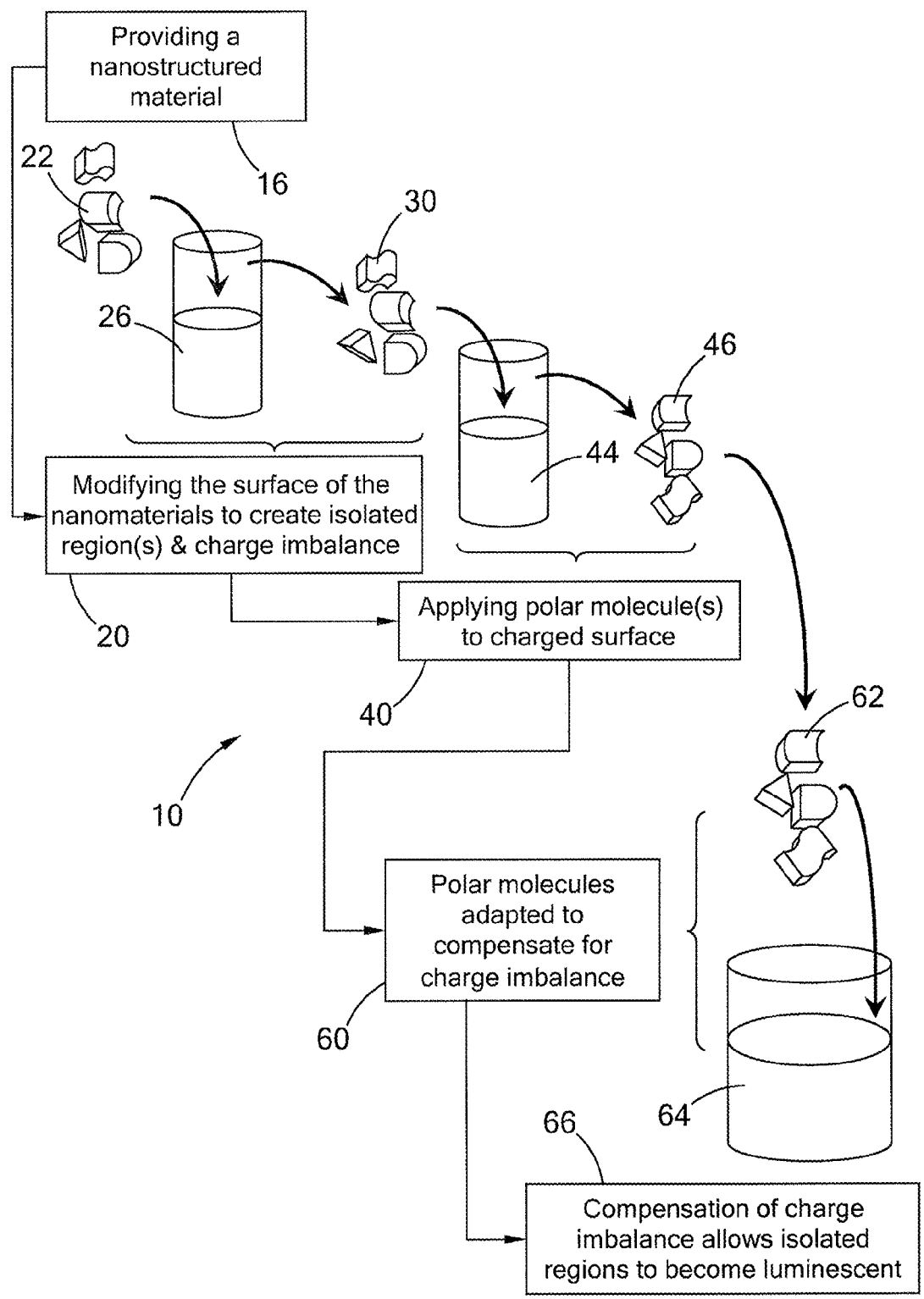
FIG. 1A is a flow chart depicting a method of preparing a compensated, charge-isolated luminescent system according to the teachings of the present disclosure.

The following description is merely exemplary in nature and is in no way intended to limit the present disclosure or its application or uses. It should be understood that throughout the description and drawings, corresponding reference numerals indicate like or corresponding parts and features.

The present disclosure generally provides a method of making non-luminescent nanostructured materials into a luminescent system. The term, luminescence, as used throughout this disclosure is intended to generally refer to photoluminescence and/or electroluminescence. Referring to FIG. 1A, according to one embodiment of the present disclosure the method 10 comprises the steps of providing 16 a nanostructured material that has a predetermined surface. This nanostructured material initially will not exhibit luminescent behavior. The surface of the material is modified 20 to create at least one small, isolated region that may act as a luminescent center. However, this surface modification also generates additional or "unwanted" charge on the surface of the material leading to a charge imbalance. This charge imbalance prevents the isolated region from exhibiting luminescent properties. Thus the charge imbalance needs to be neutralized or compensated for.

Compensation for this surface charge imbalance can be accomplished by the application 40 of one or more polar molecules to the surface of the nanostructured material. These polar molecules are adapted 60 to compensate for the charge imbalance. Such adaptation may include the alignment of the polar molecules on the surface of the nanostructured material. Upon the neutralization or compensation 66 of the charge imbalance, the isolated regions will act as luminescent centers and exhibit luminescent properties, thereby, forming a luminescent system 64. Preferably, the luminescent system 64 will be comprised of a nanostructured material that includes a plurality of luminescent centers.

Still referring to FIG. 1A, the nanostructured material 22 may be dispersed into a liquid solution 26 for oxidation of its surface. The liquid solution 26 may be comprised of concentrated $HNO_3$ or mixtures of $HNO_3$, $H_2SO_4$, $H_2O_2$ or $KMnO_4$. Acid etching is one method of forming the isolated regions or luminescent centers on the surface of the nanostructured material, as well as generating the excess or unwanted charge that creates a charge imbalance on the surface of the nanostructured material. The isolated regions represent a domain, hole, a single unit cell, or confinement state that has the potential to exhibit photoluminescence or electroluminescence. Acid etching incorporates acid functionality, such as carboxylic acid (i.e., —COOH) groups, onto the surface of the nanostructured material. Such acid treatment may involve reaction times on the order of minutes to days, as well as the use of elevated temperatures (e.g., 100° C. for 4 hours). The concentrated acidic solution 26 may be refluxed to facilitate the acidic groups first becoming coupled to the open ends of the nanostructured material followed by coupling to the remaining surface area of the material. Neutralization of the acidic solution 26 with alkali may result in the precipitation of the acid functionalized nanostructured materials 30, which can then be collected by filtration, evaporation, or any other known method. Carboxylic acid functionalized nanostructured materials 30 may also be formed by chlorate or ammonium persulfate oxidation.

The main acid functionalities that exist on the surface of the charged nanostructured material 30 may include —COOH, —C=O, and —OH moieties among others. The ratio of (—COOH):(—C=O):(—OH) groups on the surface will usually be on the order of about 4:2:1. However, one skilled in the art will understand that this ratio can vary depending upon the treatment of the material with concentrated acids. Acidic treatment of the material's surface with concentrated acid results in the formation of a surface exhibiting an atomic ratio of C:O:H on the order of about 2.7:1.0:1.2. The concentration of the acidic groups present on the surface of the charged nanostructured material 30 is typically in the range of about $2 \times 10^{20}$ to $10 \times 10^{20}$ sites per gram, which corresponds to about a 5 to 7% molar concentration or about 2 to 7 weight %. The acid etching or treatment of the nanostructured material's surface will also result in the surface having a charge polarity or imbalance.

Figure 1B:
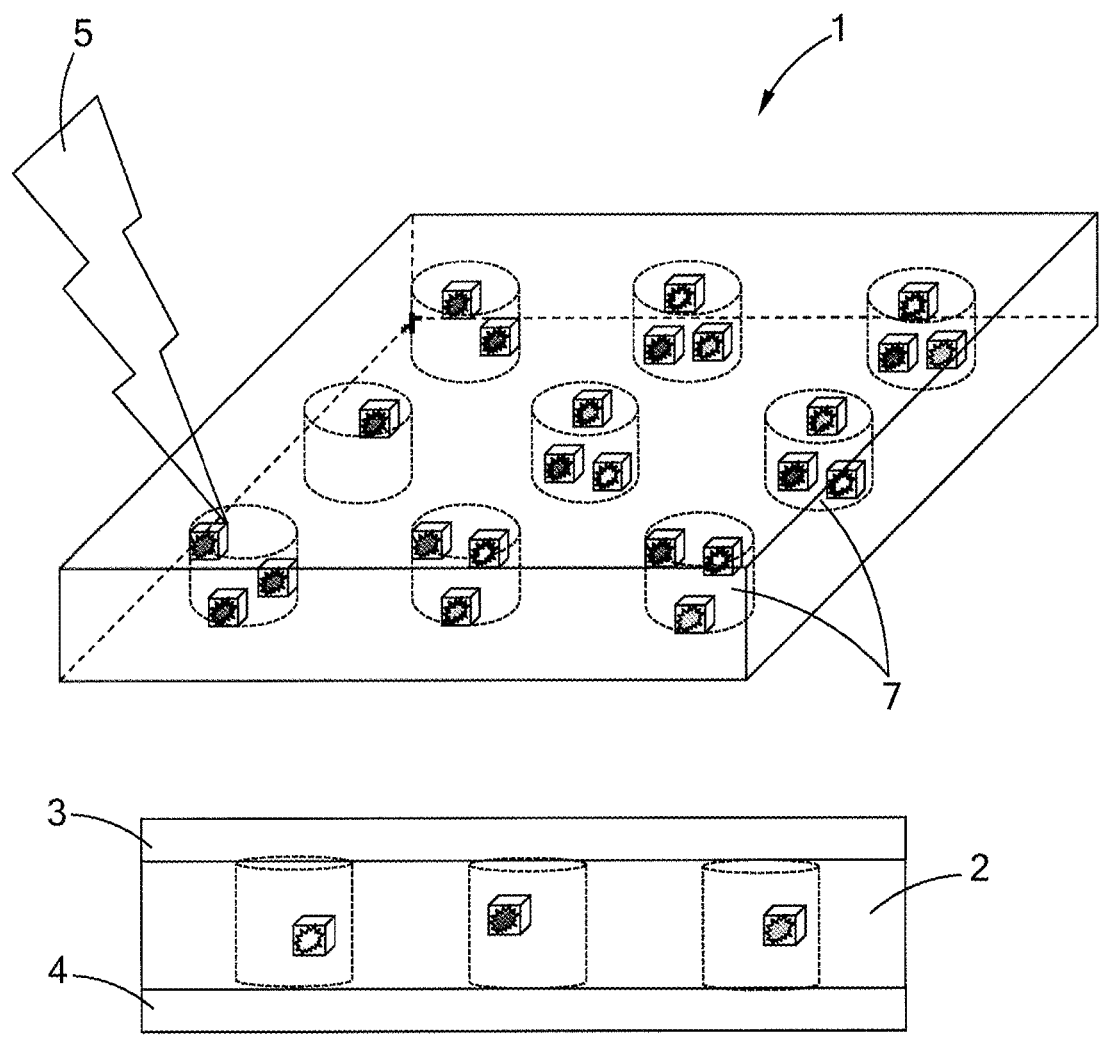
FIG. 1B is a schematic representation of a nanostructured material as a sandwiched layer in a planar structure according to one aspect of the present disclosure.

Another aspect of the present disclosure is to provide a planar-like electroluminescent system 1 for use in optoelectronic light-emitting displays, solar panels, or optoelectronic sensing elements wherein the luminescent centers are incorporated into a planar-like structure (e.g., display, etc.). Referring to FIG. 1B, the isolation of the luminescent centers 7 may be accomplished by a variety of standard lithographic processes 5 utilized in the fabrication of inorganic materials, including, but not limited to plasma etching, e-beam lithography, atomic layer deposition, and planarization. Alternatively, the isolation of the luminescent centers may be accomplished by one of the processes 5 associated with the wet processing of organic electronic devices. In both of these types of processes 5, loose nanostructured materials may be formed and incorporated into a central layer 2 which is sandwiched between two insulating, semiconducting, or metallic layers 3, 4, each of which may be separately applied. The luminescent centers 7 may also be formed by a lithographic processing 5 step in which a hole, edge, or otherwise isolated region is created and which, when charge compensated, yields photo- or electro-luminescent behavior. The sandwiched layers 2, 3, 4 may be further tailored to provide the charge compensation required for luminescence of the center 7, and include inorganic dielectrics, semiconductors, or metals, as well as organic small molecules, polymers, or the like.

Still referring to FIG. 1B, the processing of central layer 2 may include spotting charge-compensated luminescent centers 7 into regions, as by inkjet, aerosol, spray, dielectrophoresis, magnetic deposition techniques; or the in situ creation of luminescent centers and in situ methods of charge compensation using lithographic processing steps, such as local plasma, ion, or electron irradiation with etchants, CVD deposition, ALD, or polymer processing. "Pixels" of localized luminescent centers 7 can be incorporated into layers of electrodes or substrates, rigid or flexible.

Figure 1C:
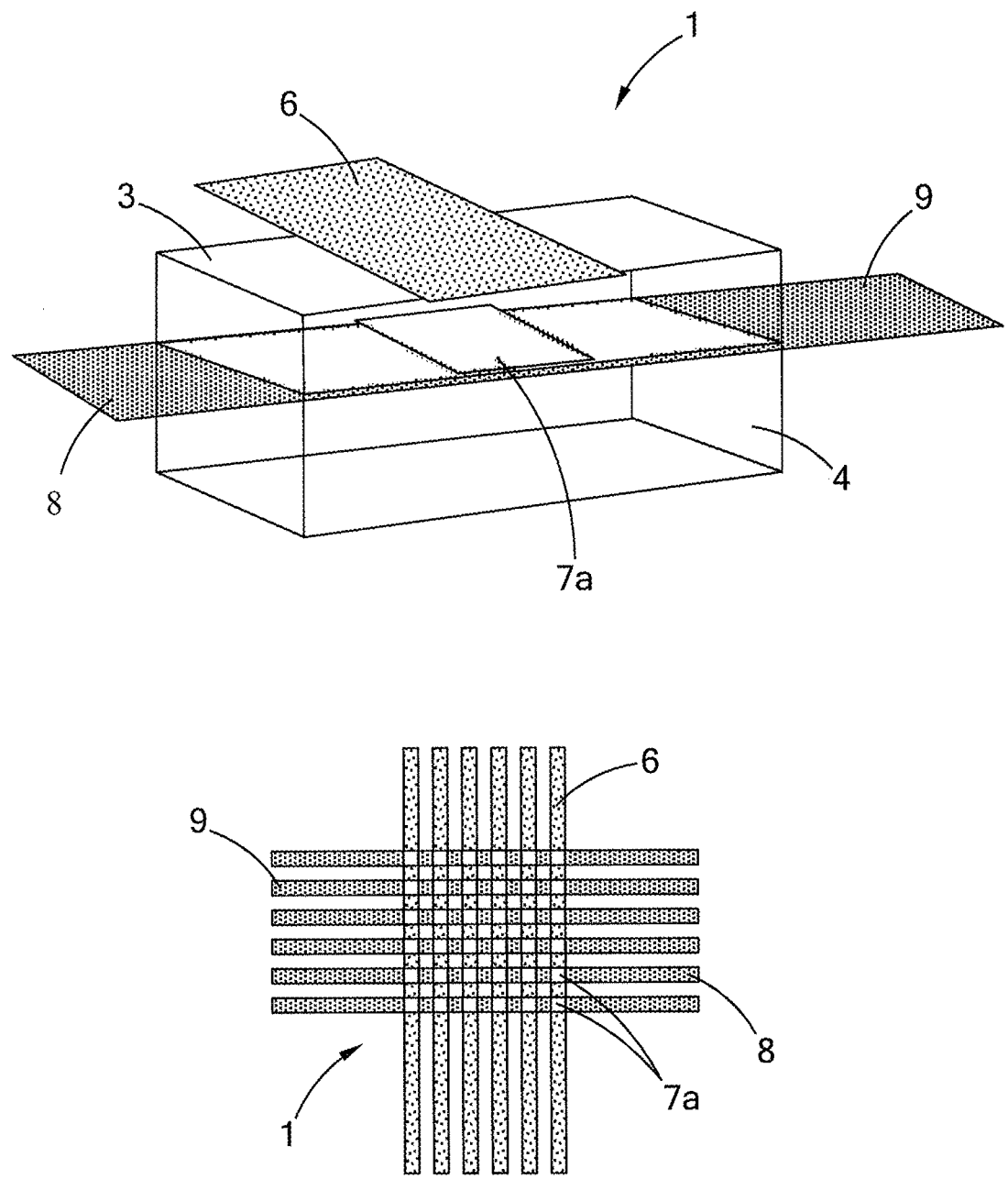
FIG. 1C is a schematic representation of a planar-like electroluminescent system prepared according to one aspect of the present disclosure.

Referring now to FIG. 1C, one example of the planar-like electroluminescent system 1 according to another aspect of the present disclosure may include an electroluminescent patch 7a created from the material of the gate electrode 6 used in a deposition process (e.g., e-beam, ozone, focused ion beam, among others). In this case, the electroluminescent patch 7a represents the isolated region or luminescent center. The electroluminescent patch 7a may be deposited in the gap between the source electrode 9 and the drain electrode 8 or grown in the gap to bridge the electrodes 8, 9. The electrodes 8, 9 reside between the dielectric layers 3, 4. The electroluminescent patch 7a may also be prepared using the luminescent system 64 or nanostructured material 62 having isolated regions prepared according to the process shown in FIG. 1A. The planar-like electroluminescent system 1 (e.g., a display, etc.) may include an assembly of individually addressable electroluminescent patches 7a.

Figure 2A:
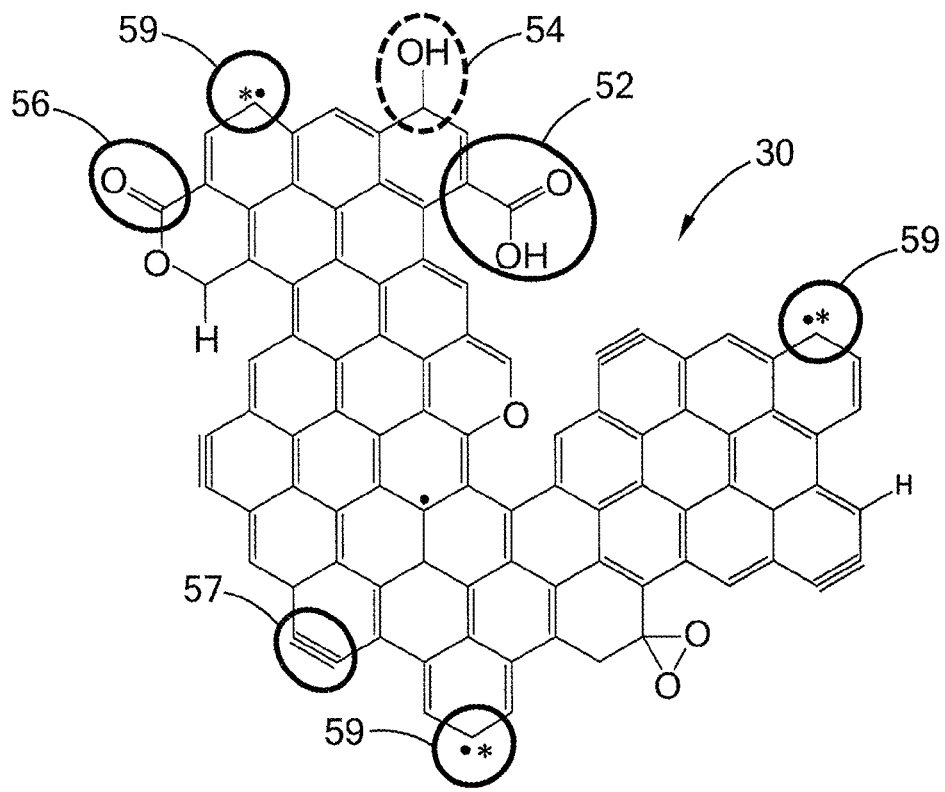
FIG. 2A is a schematic representation of the chemical structure of a nanostructured material according to one aspect of the present disclosure.
Figure 2B:
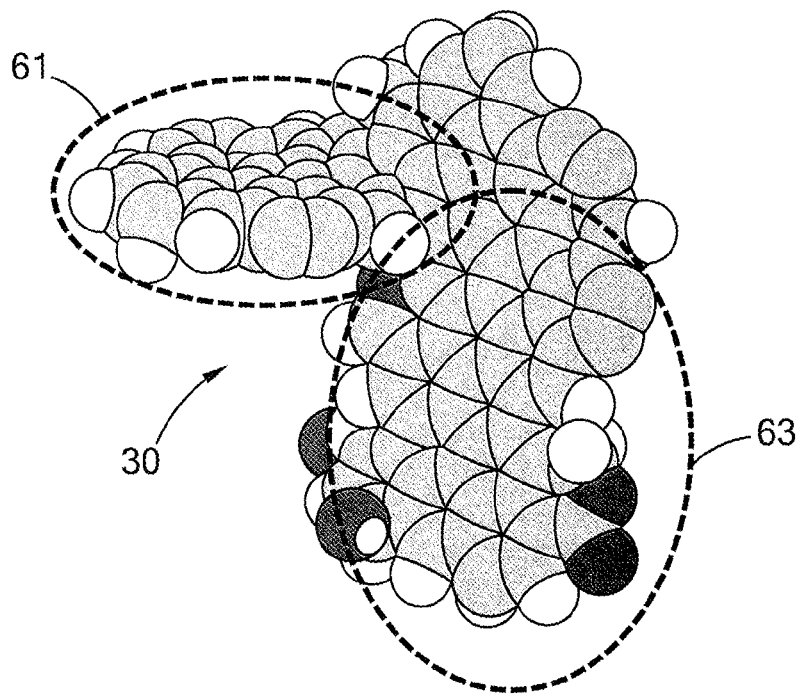
FIG. 2B is a perspective view of a chemical model depicting the chemical structure of the nanostructured material of FIG. 2A.

Referring now to FIGS. 2A and 2B, a carbon nanostructured material 30 prepared according to one aspect of the present disclosure is depicted. Surface modification of this nanostructured material 30 leads to the formation of a charge on the edges of the material by various charged edge groups. Preferably, these charged groups are carboxylic acid (—COOH) moieties 52, hydroxyl or alcohol (—OH) moieties 54, or carbonyl (—C=O) moieties 56, but may also be a result of the interaction between a carbene or carbyne 57 with a liquid solution or solvent. In the case of a carbene end group, the interaction between this end group and the solution may lead to the formation of a positively charged carbon or zigzag site 59 with potential pairing of the sigma (*) and pi ($\pi$) electrons occurring proximate to this zig-zag site 59.

Referring now to FIG. 2B, the weakened pi-system of the carbon nanostructured material 30 may result in the breaking of the pi-system conjugation inside the nanostructured material 50, thereby, resulting in the formation of two more weakly interacting pi-systems 61, 63. Such a reduced conjugation of the pi-system can lead to a blue shift in the luminescence of the nanostructures even without a significant change in hydrodynamic radius. A saturated hydrocarbon surfactant or chemical modifier may be attached to the material 30 via charge or chemical interaction with its functional moieties, such as a carbonyl 56, carboxyl 52, or hydroxyl moiety 54, in order to decrease access to the pi-system from known luminescent quenching molecules.

Figure 3:
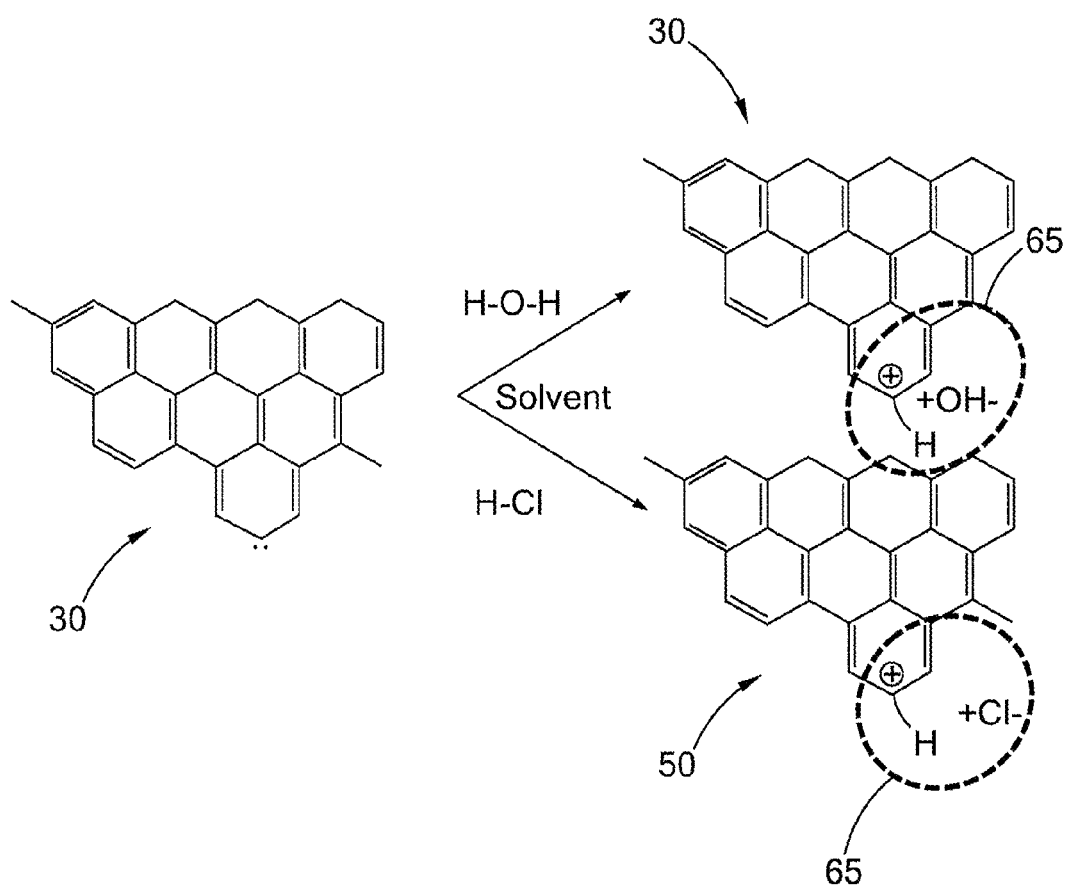
FIG. 3 is a schematic representation depicting the formation of a positive edge charge on a nanostructured material through an interaction with a solvent according to one aspect of the present disclosure.

The step of modifying 20 the surface of nanostructured material 22 involves one selected from the group of acid etching the surface of the nanostructured material 22 and functionalizing the surface of the nanostructured material 22 with charged groups in the presence of a solvent. Referring now to FIG. 3, the formation of a positive edge charge 65 through an interaction with the solvent is depicted. In general, in addition to charge formation, edge modification breaking along the conjugated pi-system is expected (see FIG. 2B). Tunability of the luminescent properties of the single wall nanostructured material 30, e.g., a carbon nanohorn, as a function of excitation wavelength may indicate separate excitation of the isolated conjugated pi-system within the nanohorn assembly.

The breaking of large conjugated pi-systems may result in non-zero energy of the HOMO-LUMO molecular orbital gap for the isolated pi-system within a single walled, nanostructured material or its assembly. The smaller the size of the isolated polycyclic aromatic hydrocarbon, the larger the HOMO-LUMO gap will be. For example, in reference to an isolated benzene moiety, the expected band gap is about 6.8 eV whereas for coronene (a large conjugated system) the HOMO-LUMO gap is 4.04 eV. These two examples may be used as limiting cases in order to estimate a predetermined range of tunability for luminescent properties. This tunable range is estimated to be about 2.76 eV. This example considers only un-substituted polycyclic aromatic hydrocarbons (PAHs). If the conjugated pi-system of PAHs are close (e.g., one $sp^3$ bond) to the polar edge groups, their HOMO-LUMO molecular orbital gap will be affected; dependent upon the charge and electron donating/withdrawing nature of the edge functionality. In extreme cases this interaction may lead to non-radiative relaxation of the excited state of PAH via the coupling of it to the vibrational modes of the solvent.

Figure 4A:
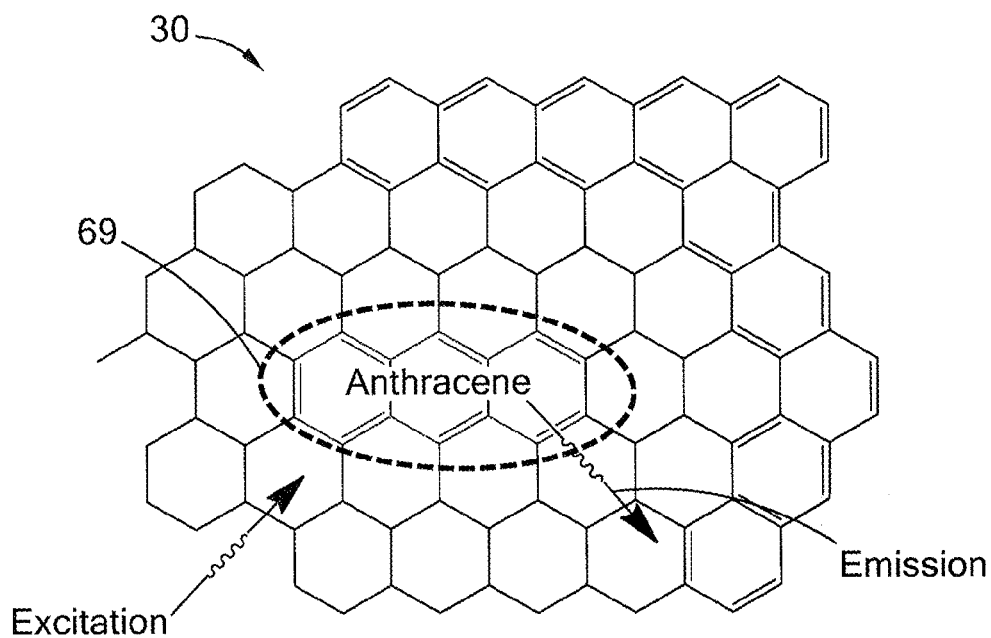
FIG. 4A is a schematic representation of the chemical structure of a nanostructured material according to another aspect of the present disclosure.
Figure 4B:
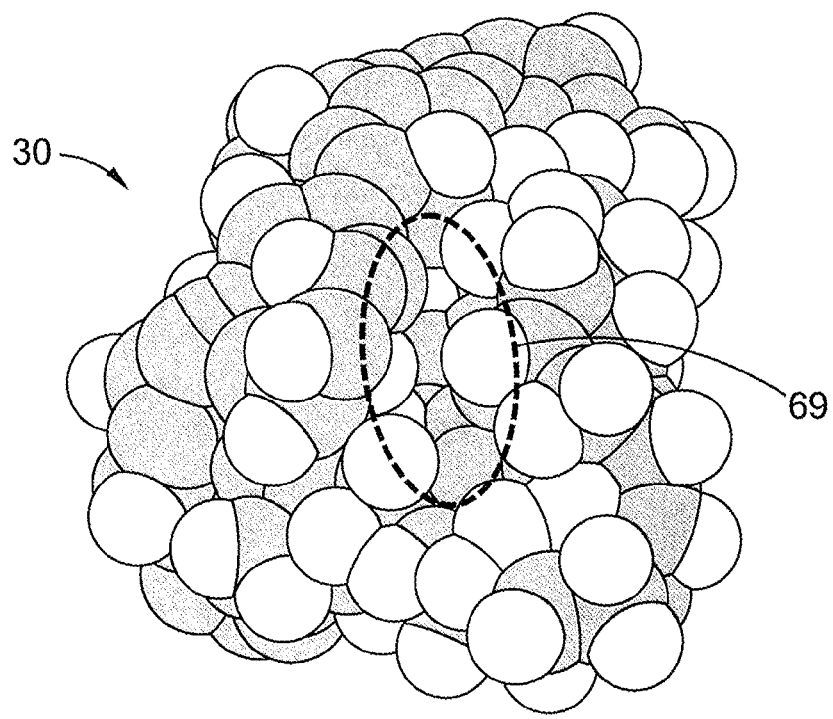
FIG. 4B is a perspective view of a chemical model depicting the chemical structure of the nanostructured material of FIG. 4A.

Referring now to FIGS. 4A and 4B, an example of the steric hindrance and structural distortion of an enclosed pi-system of a polycyclic hydrocarbon within the nanostructured material 30 is demonstrated. The chemistry of carbon edge groups may induce instances of complete hydrogenation of the majority of the double bonds, leaving small areas of isolated polycyclic aromatic hydrocarbons. The example shows a luminescent anthracene 69 moiety surrounded by $sp^3$ and $sp^2$ hybridized carbon atoms. Energy minimization of this structure shows that access to anthracene 69 moiety (best shown in FIG. 4B) is hindered by the $sp^2$-$sp^3$ hybridized carbons and that the anthracene 69 moiety is not planar (i.e., perturbed). The expected excitation and luminescence of this moiety 69 will be red shifted from that exhibited by pure anthracene.

Figure 5:
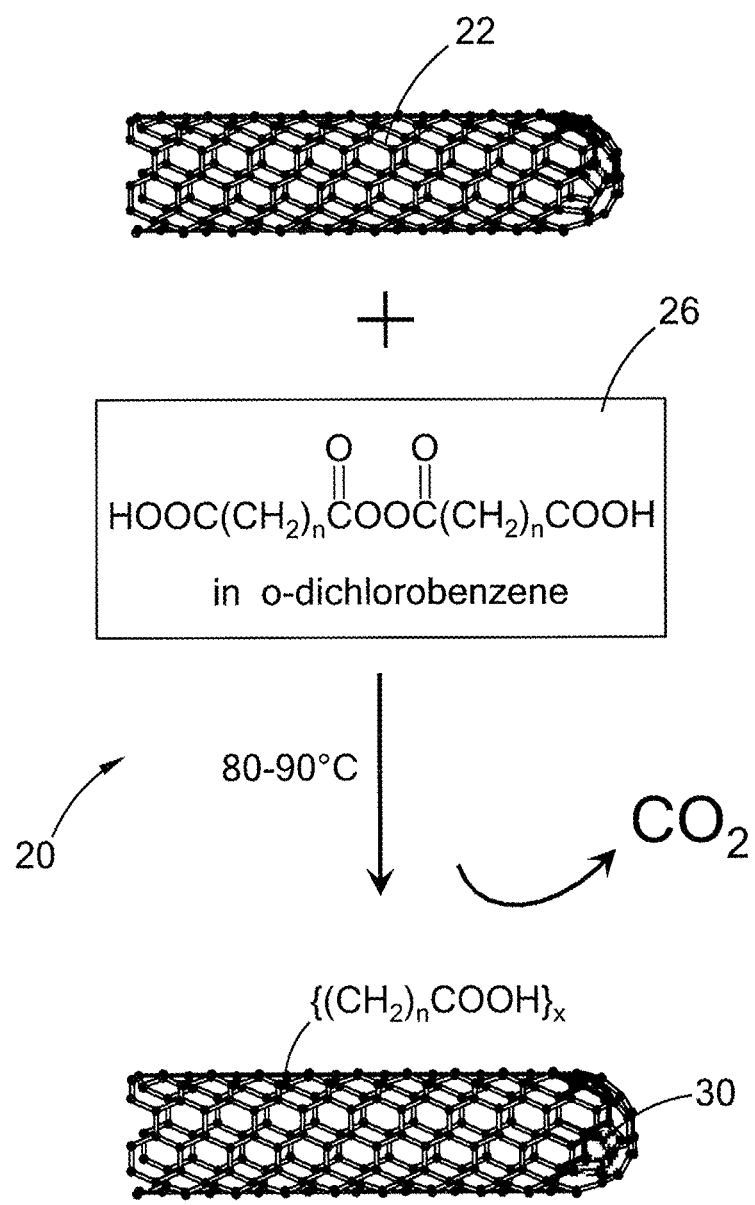
FIG. 5 is a schematic of a method for compensating for the charge present on the surface of a nanostructured material according to one aspect of the present disclosure.

The surface of the nanostructured material 22 may also be charged 20 through functionalization with acidic moieties coupled to long chain hydrocarbons. For example, referring to FIG. 5 the surface of carbon nanostructured materials 22 may be reacted with a mixture of succinic or glutaric acid acyl peroxides in o-dichlorobenzene 26 at about 80-90° C. This reaction results in the formation of a 2-carboxyethyl or 3-carboxypropyl surface functionalized material 30. One skilled-in-the-art will understand that other reactions than those depicted herein are also possible for the functionalization of the nanostructured material's surface with acid moieties.

Figure 6A:
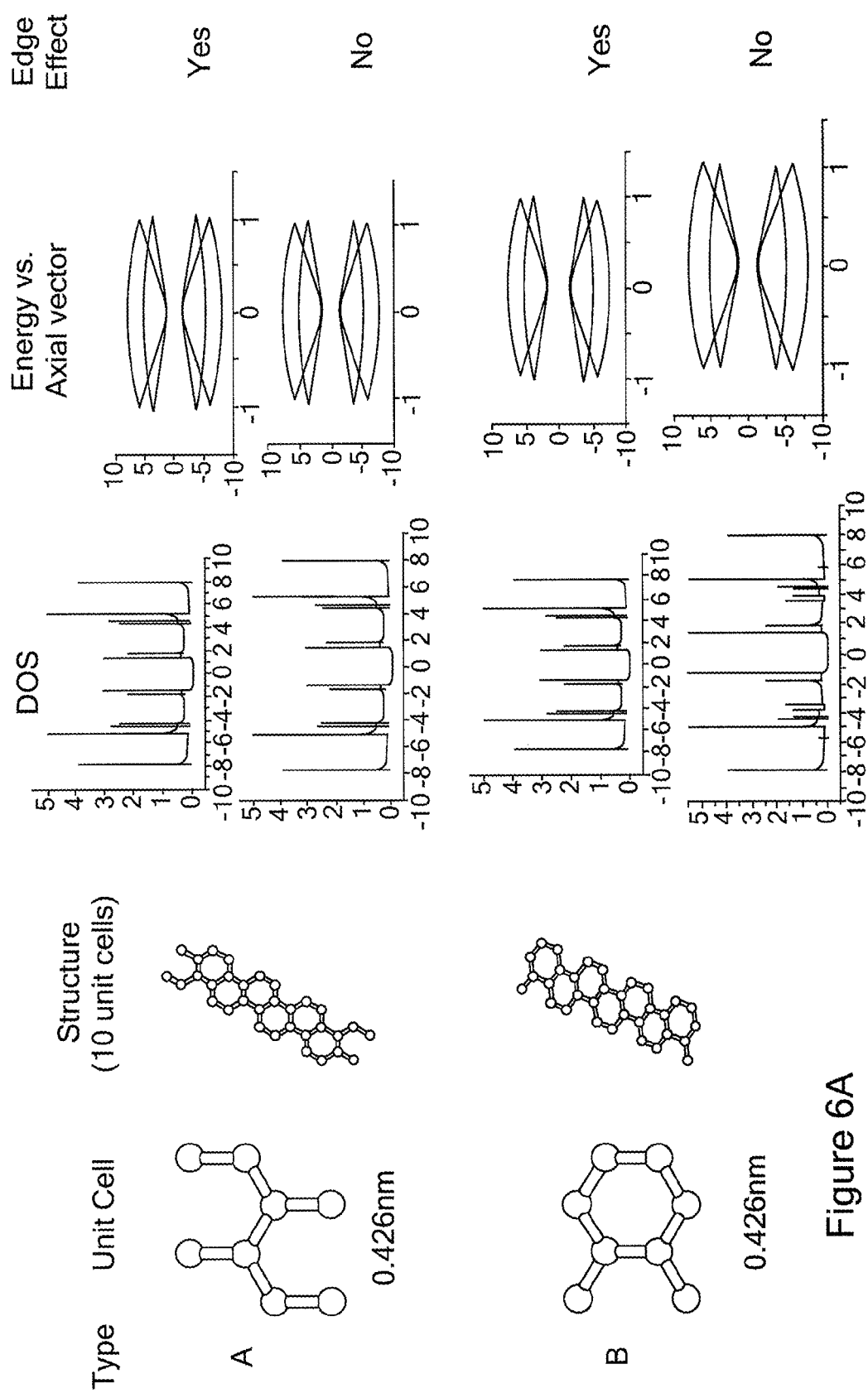
FIG. 6A is a schematic representation of the structure and performance of large luminescent centers on a nanostructured material according to one aspect of the present disclosure.

According to another aspect of the present disclosure, in addition to isolated regions being on a molecular (e.g., small) scale as described above, the isolated regions can also be much larger, i.e., large luminescent center (LLC). These large luminescent centers may be the result of the superposition of multiple single unit cells as described in FIG. 6A. Referring to FIG. 6A, two examples of large luminescent centers are shown in which the structure of the LLC includes a combination of ten unit cells (A or B). These specific examples may be identified as a semiconducting arm chair LLC (n=4, m=0). One skilled-in-the-art will understand that the luminescent center on the nanostructured material may be comprised of other ribbons that exhibit semiconducting character. The band gap luminescence of LLC examples shown in FIG. 6A is on the order of 2.55 eV (with no edge effect) and 2.81 eV (with edge relaxation). One skilled-in-the-art will understand that the tunable range for a LLC is similar to that described above for a molecular, small luminescent center (i.e., about 2.76 eV). A specific example of a nanostructured material with an isolated region being an LLC, includes, but is not limited to, an isolated graphene ribbon located on the surface of a carbon nanohorn. The incorporation of such an LLC into a carbon nanohorn may cause stress induced changes in the curvature of the nanostructured material (e.g., warping). Such stress induced changes will result in the shift of the luminescence to either lower or higher energy. One skilled-in-the art will understand that a large luminescent center may also include a combination of, i.e., more than one, different or similar LLC without exceeding the scope of the present disclosure.

The step of applying 40 polar molecules to the charged surface involves one selected from the group of immersing the charged nanostructured material 30 into a solution comprising the polar molecules 44 and applying the polar molecules 44 as part of a coating to the surface of the nanostructured material. The polar molecules 44 are typically comprised of a long alkyl chain having a polar group at one end. Examples of polar groups include, but are not limited to, hydroxyl, carboxyl, sulfonate, sulfate, ammonium, amino, and polyoxyethylene. When the polar group is for example, an alcohol or amine group, the polar group can easily be coupled to the acid functionality of the nanostructured material through stable ester or amide linkages. In the case of amine functionality, the carboxylic acid groups on the surface of the charged nanostructured material 30 may undergo a reaction with the polar groups, including but not limited to, amidation, an acid-base interaction, or condensation. An example of functionalizing a nanostructured material having carboxylic acid functionality 30 with a $CH_3(CH_2)_{17}NH_2$ polar molecule 44 via a simple acid-base interaction to yield a nanostructured material interacting with a polar molecule 46 is demonstrated in Equation 1. However, the simple chemical bonding of any molecule to surface of a nanostructured material either covalently, non-covalently, or a combination thereof will not by itself allow the isolated region to exhibit luminescent properties.

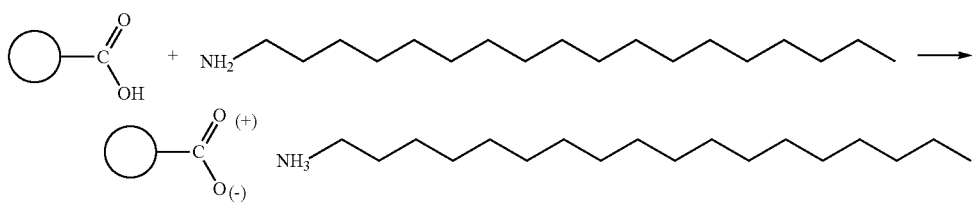

Eq. 1

Rather, one limitation on type and selection of the polar molecules is that the polar molecules used in accordance with the present disclosure are adapted to compensate for the charge imbalance on the surface of the nanostructured material 30. For example, the compensation for or neutralization of the charge imbalance may involve the alignment of the polar molecules on the surface of the nanostructured material 62. Such alignment may involve a charge alignment mechanism. Charge redistribution of the electric double layer encompassing the surface of the charged nanostructured material takes place as a result of the alignment of polar molecules on the material's surface. Once the initial polar molecules are aligned, neighboring polar molecules will tend to orient themselves relative to each other so as to minimize the interaction energy that exists between them; resulting in nanostructured material with aligned polar molecules 62. The redistribution of charge implies the formation of an electric double layer in which the polar molecules 44 neutralize the surface of the charged nanostructured material 30.

Figure 6B:
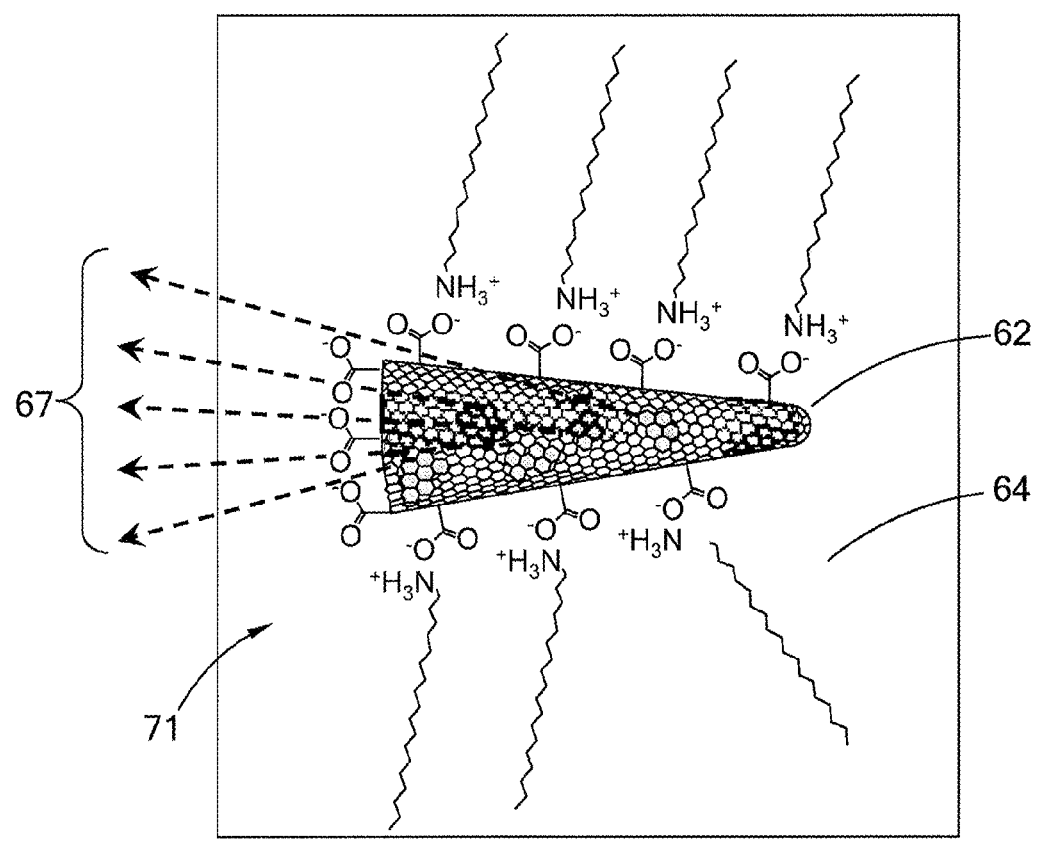
FIG. 6B is a schematic representation of a luminescent system prepared according to one aspect of the present disclosure.

An example of a nanostructured system 71 in which polar molecules are attracted to the charged surface and aligned with one another is depicted in FIG. 6B. Upon exposure to polar molecules 64 a nanostructured material 62 on its surface results in the formation of a of a nanostructured material having polar molecules aligned on its surface that exhibits luminescence 67. Luminescence 67 is dependent upon both the existence of a charged nanostructured material 62 and the interaction of a polar molecule 64 with this surface to form a nanostructured system 71 in which the polar molecules compensate for the charge imbalance on the surface. No visible luminescence will occur for similar systems in which the surface of nanostructured material has neither been modified 20 to create an isolated region to act as a small, molecular luminescent center or LLC nor has been exposed 40 to polar molecules in such a manner as to cause the these molecules to compensate for the charge imbalance induced on the surface of the nanostructured material 62 during the occurrence of the surface modification.

It is another objective of the present disclosure to provide a photoluminescent or electroluminescent system for incorporation into and use as biological markers, in sensors, for drug delivery, as optoelectronics, or in energy conversion devices. This luminescent system 64 generally comprises a plurality of the nanostructured material 62 dispersed in a rigid inorganic matrix, a liquid solution, a gel, or a polymer matrix. The nanostructured material 62 has a charged surface with at least one polar molecule being coupled to the charged surface and oriented in a predetermined manner to compensate for the charge imbalance on the surface of the material. When a plurality of polar molecules is utilized, these polar molecules may be aligned with one another. It is the neutralization or compensation of the charge imbalance on the surface of the nanostructured material by the application of these polar molecules that induces the isolated regions to act as luminescent centers, thereby, allowing the system 64 to exhibit a luminescent effect.

The nanostructured material of the present disclosure may be formed from a variety of materials, such as boron nitride, amorphous carbon, or silicon carbide, and mixtures or combinations thereof, among others. The nanostructured material may be selected as one from the group of single-walled nanotubes (SWNT), multi-walled nanotubes (MWNT), small nanohorns, large nanohorns, nano-onions, graphene flakes, and combinations or mixtures thereof. One skilled-in-the-art will understand that the nanostructured materials may include other types of structures and particles without exceeding the scope of the disclosure. The term nanostructured material generally refers to a collection of more than one nanotube, nanohorn, nano-onion, or graphene flake, or a combination thereof.

Although the size of the nanostructured material is believed to be insignificant with respect to the ability of the material to exhibit luminescent properties, for many applications the use of particles that are well in excess of 100 nm would be desirable. According to one aspect of the present disclosure, nanostructured materials exhibiting a size greater than 100 nanometers, greater than 150 nanometers, and even greater than 200 nanometers, can exhibit luminescent properties provided that the materials comprise at least one isolated region with the resulting charge imbalance being compensated by the alignment of polar molecules on the surface of the material.

Similarly, planar nanostructured materials such as graphene can currently be produced from flakes of nanometer dimension (the size of a benzene ring) to square meters in size for applications ranging from biological markers to flat panel displays, solar cells, and other large area optoelectronic applications. According to one aspect of the present disclosure, localized luminescent centers can be induced in single or multi-layered graphene or similar thin nanostructured materials comprised of other materials (e.g. BN, SiC, Si, etc.) through the local creation of defects (such as by forming holes in the lattice, etching processes, means of incorporating substitutional atoms, depositing surface coatings, or the like) followed by the compensation of the charge imbalance through interaction with other inorganic or organic molecules. Thus, materials may be produced with one or more localized luminescent centers with sizes ranging from small molecules to loose planar flakes in a matrix of a gas, liquid, large sheets, or on substrates that may be patterned with regular arrays of luminescent centers, such as for large-area optoelectronic applications.

Carbon nanostructured materials as used in the present disclosure may be prepared using any technique known to one skilled-in-the-art, including but not limited to, laser vaporization, electric arc discharge, and gas phase catalytic reaction (e.g., the HIPCO™ process). Laser vaporization typically includes a pulse laser to vaporize graphite to produce carbon nanostructured materials having a diameter of about 1.2 nanometers. In electric arc discharge, single walled carbon nanotubes are usually produced as close-packed bundles having diameters in the range of about 5 to 20 nanometers. High purity carbon nanotubes having a diameter less than about 1 nanometer may be formed in the HIPCO™ process, which involves the use of carbon monoxide gas under predetermined temperature and pressure conditions.

The charged surface of the nanostructured material preferably results from the surface of the material being functionalized with carboxylic acid (—COOH) groups. However, one skilled-in-the-art will understand that other acidic functionality may be used to provide the charge imbalance on the material's surface and to provide a means for coupling with a polar molecule.

The polar molecules applied to the surface of the charged nano-structured material are preferably selected as one from the group of polar surfactants and dispersants. The polar molecules may be dispersed in a solvent to form the liquid solution or be in a high enough concentration that the polar molecules are considered to form a neat liquid solution. The polar molecules used in the luminescent system of the present disclosure is preferably one selected from the group of polyethylene glycol (PEG), polyethyleneimine (PEI), and sodium dodecyl sulphate (SDS). However, one skilled-in-the-art will understand that other polar surfactants and dispersants may be utilized to provide a similar luminescent effect when coupled to the surface of a charged nanostructured material.

The following specific examples are given to illustrate the invention and should not be construed to limit the scope of the invention.

Example 1

Measurement of Photoluminescence for Nanostructured Material Systems and Photoluminescence of [(SWNH-COOH)/PEG]

Figure 7A:
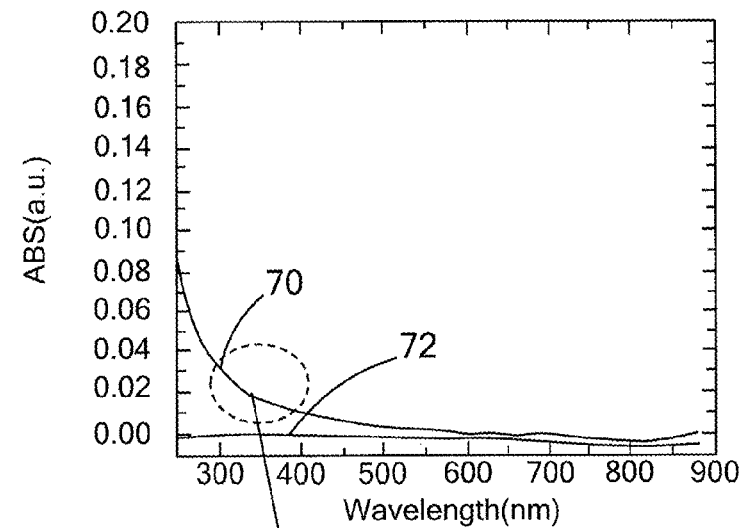
FIG. 7A is a graphical representation of the light absorbance characteristic of a "single-wall carbon nanohorn modified with carboxylic acid functionality" [(SWNH-COOH)/PEG] luminescent system prepared according to one aspect of the present disclosure plotted as a function of the excitation wavelength.

The light absorption and emission characteristics of various nanostructured material systems and polar liquids can be measured using conventional photoluminescent spectroscopic techniques. The absorption of light by a sample is first measured as a function of the light's wavelength. As shown in FIG. 7A, for example, a sample comprising acid functionalized single wall nanohorns (SWNH-COOH) dispersed in polyethylene glycol (PEG) 70 is observed to absorb light below about 400 nanometers, while the neat solution of polar molecules (PEG) 72 does not absorb light within this region.

Figure 7C:
FIG. 7C is a graphical combination of the light absorbance and emission characteristics of the system of FIG. 7A depicting the occurrence of luminescence.
Figure 7B:
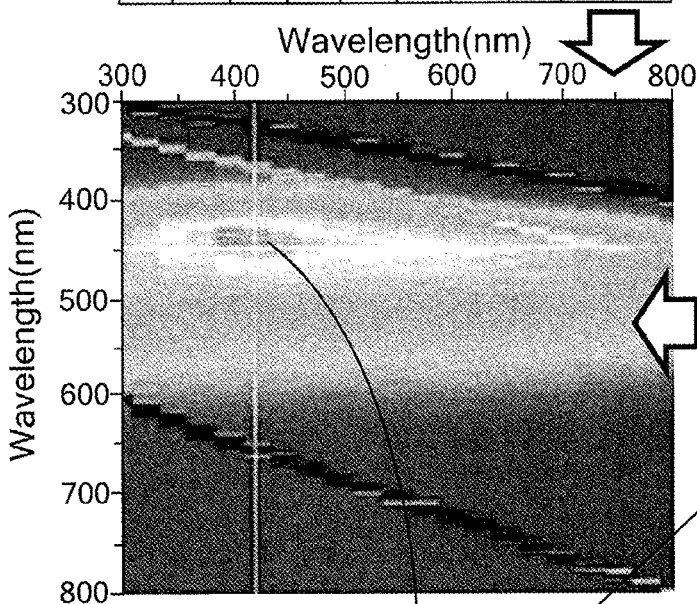
FIG. 7B is a graphical representation of the light emission characteristic of the luminescent system of FIG. 7A.
Figure 7B:
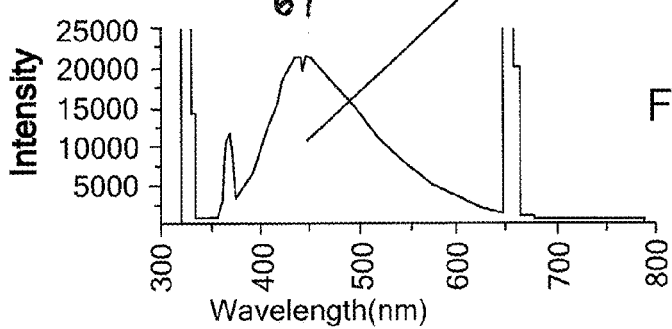

Next as shown in FIG. 7B, the emission characteristics of the sample (i.e., [(SWNH-COOH)/PEG]) are measured. In this example, the charged nanohorns with applied polar molecules (FIG. 7B) are observed to emit light at a slightly longer wavelength (Stoke's shift) than the wavelength of light that was absorbed (FIG. 7A). The light emitted is within a range that starts at about 400 nanometers and ends at about 650 nanometers. The greatest intensity for the light emitted by the sample is shown to be at about 450 nanometers The ratio of the light absorbed to the light emitted can be graphically illustrated by combining the corresponding graphs of light intensity (absorbed & emitted) plotted as a function of wavelength as shown in FIG. 7C. The overlapping area of high intensity indicates the occurrence and magnitude of the photoluminescence effect 67.

This example highlights the methodology used to measure the photoluminescence effect for the variety of different nanostructured material systems and polar liquids described throughout this disclosure and in the following examples. This example also demonstrates that single walled nanohorns charged with carboxylic acid functionality and subsequently dispersed in a polar PEG medium in such a manner as to cause the polar molecules to be applied to the surface of the charged nanoparticles and to compensate for the charge on said surface, exhibits photoluminescence. In comparison, the polar molecules, PEG, in the absence of the charged nanostructured material does not exhibit photoluminescence.

Example 2

Photoluminescence of [(SWNH-COOH)/PEI]

Figure 8A:
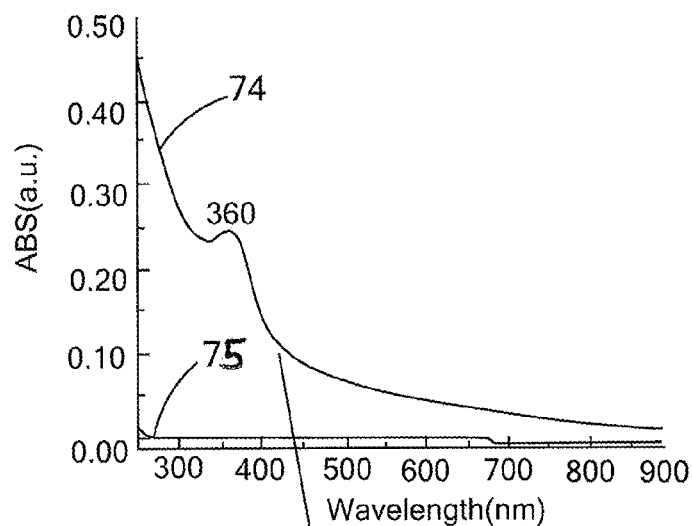
FIG. 8A is a graphical representation of the light absorbance characteristic of a [(SWNH-COOH)/PEI] luminescent system prepared according to another aspect of the present disclosure plotted as a function of the excitation wavelength.
Figure 8C:
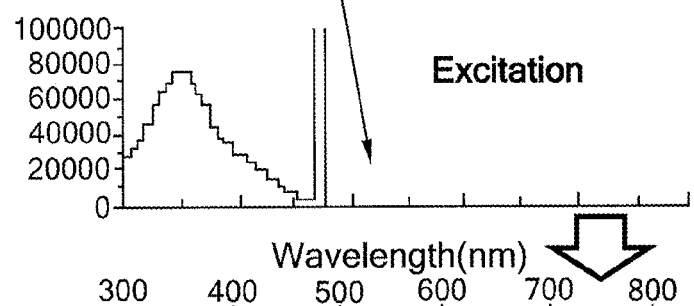
FIG. 8C is a graphical combination of the light absorbance and emission characteristics of the system of FIG. 8A depicting the occurrence of luminescence.
Figure 8B:
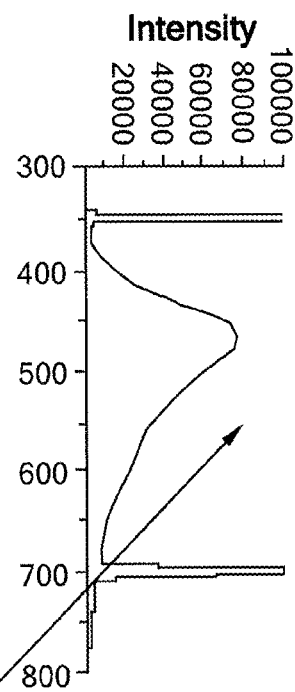
FIG. 8B is a graphical representation of the light emission characteristic of the luminescent system of FIG. 8A.
Figure 8B:
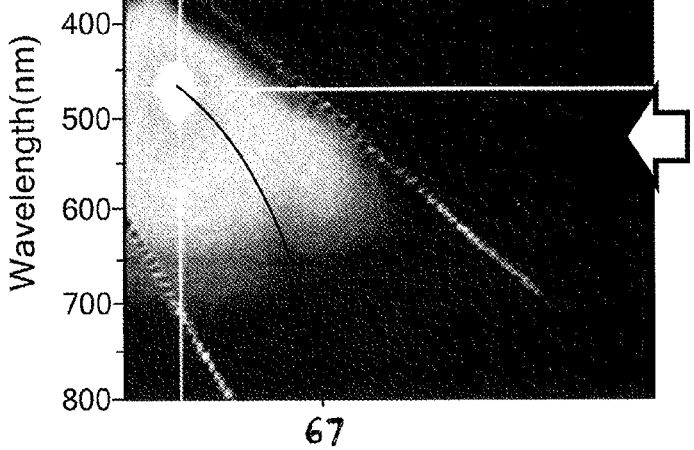

A charged nanostructured material with polar molecules 62 applied by dispersion of the nanostructured material in a solution of the polar molecule 44 was prepared according to the teachings of the present disclosure using single walled nanohorns with carboxylic acid functionality (SWNH-COOH) and polyethyleneimine (PEI) as the polar molecules. The absorption spectrum for [(SWNH-COOH)/PEI] and for PEI (neat with no nanoparticles) is shown in FIG. 8A. The [(SWNH-COOH)/PEI] 74 is observed to absorb light at less than 500 nanometers in wavelength, while the polar molecules (PEI) 75 do not show any absorption of light. In FIG. 8B, the sample of [(SWNH-COOH)/PEI] 74 is shown to emit light in the range of about 400 to 700 nanometers. In FIG. 8C, the combination of the absorption and emission spectra exhibit a relatively strong area associated with photoluminescence 67.

This example demonstrates that single walled nanohorns charged with carboxylic acid functionality and subsequently dispersed in a polar PEI medium to cause the polar molecules to be applied to the surface of the charged nanoparticles and to compensate for the charge on said surface, exhibits photoluminescence. In comparison, the polar molecules (PEI), in the absence of any charged nanoparticles, does not exhibit photoluminescence.

Example 3

No Photoluminescence with [SWNH/PEI] and [SWNH/PEG]

Figure 9A:
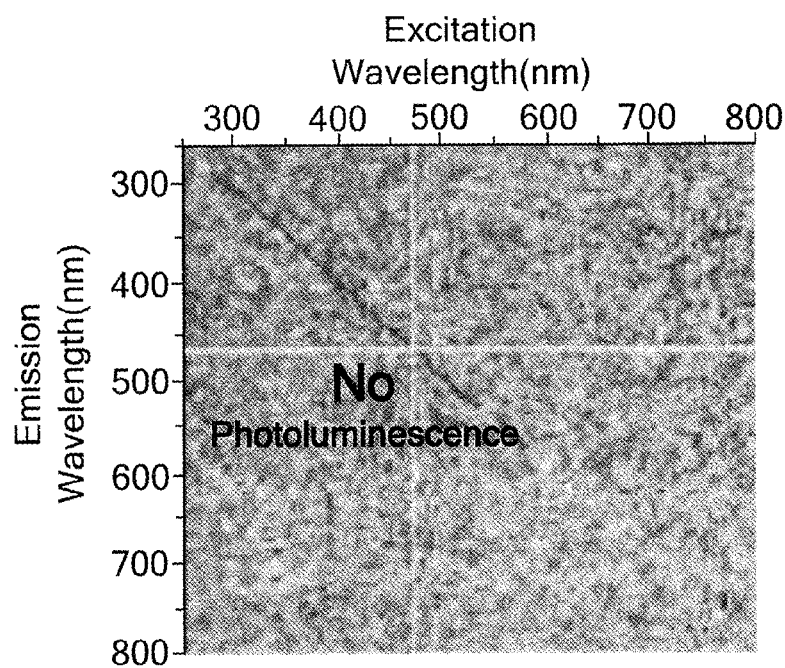
FIG. 9A is a graphical combination of the light absorbance and emission characteristics of an "as prepared single wall carbon nanohorn" [(AP-SWNH)/PEG] system depicting the absence of luminescence.
Figure 9B:
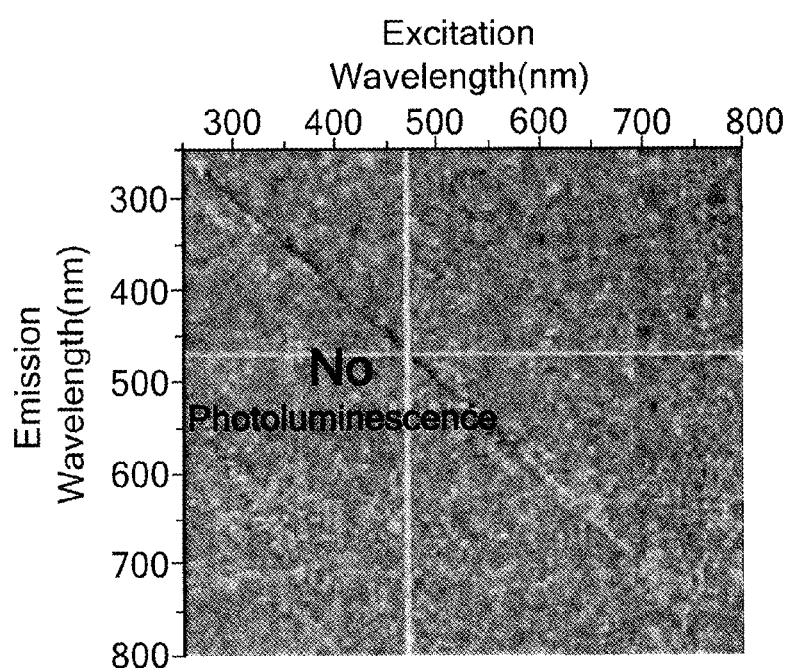
FIG. 9B is a graphical combination of the light absorbance and emission characteristics of a [(AP-SWNH)/PEI] system depicting the absence of luminescence.

Single walled nanohorns identical to the ones used in Examples 1 and 2, but without exposure to an acidic medium, were dispersed in PEI. An identical formulation was then prepared using PEG as the polar molecules. These two samples are labeled as [(AP-SWNH)/PEI] and [(AP-SWNH)/PEG], where the AP refers to the SWNH as being "as produced". No light absorption or light emission was measured for either of these two samples. As shown in FIGS. 9A and 9B no photoluminescence was observed to occur.

This example demonstrates that when the single walled nanostructured materials used in Examples 1 and 2, are not exposed to an acidic medium (i.e. the surface of these SWNT's are not charged), the subsequent dispersion of this nanostructured material with polar molecules, such as PEG and PEI, does not result in any photoluminescence.

Example 4

Photoluminescence of [(SWNH-COOH)/SDS]

Figure 10A:
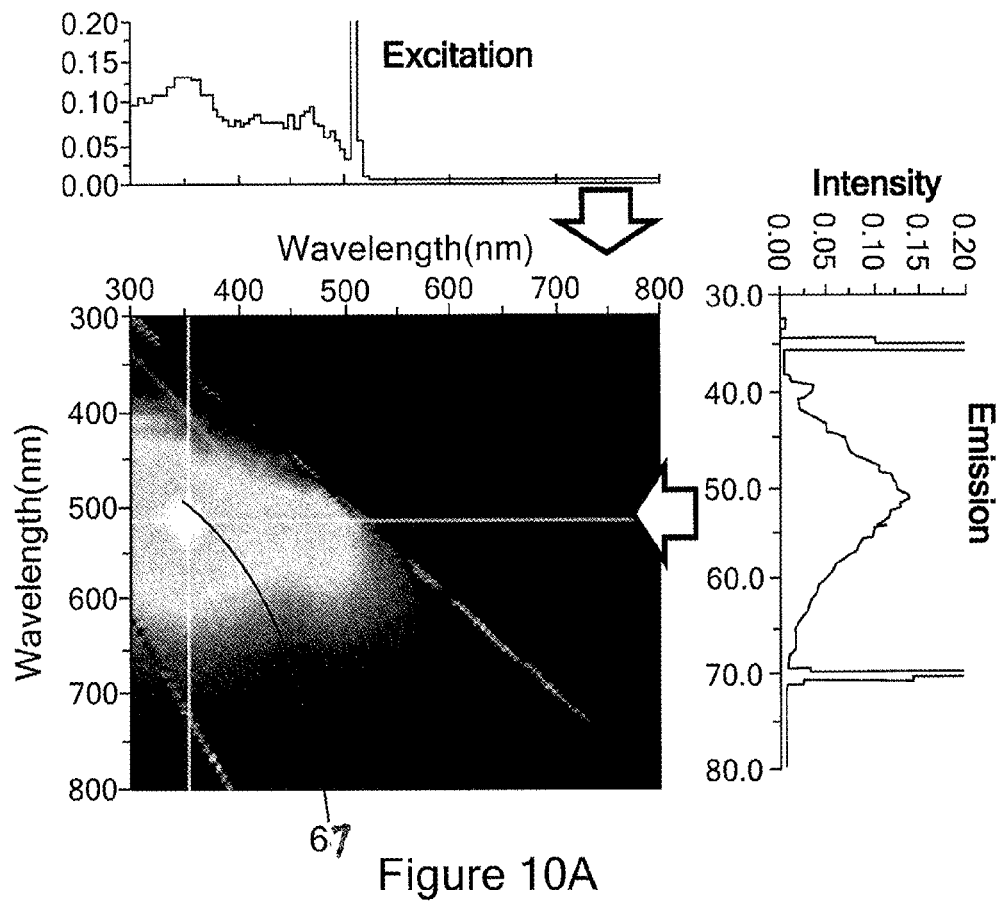
FIG. 10A is a graphical combination of the light absorbance and emission characteristics of a [(SWNH-COOH)/SDS] system prepared according to one aspect of the present disclosure depicting the occurrence of luminescence.
Figure 10B:
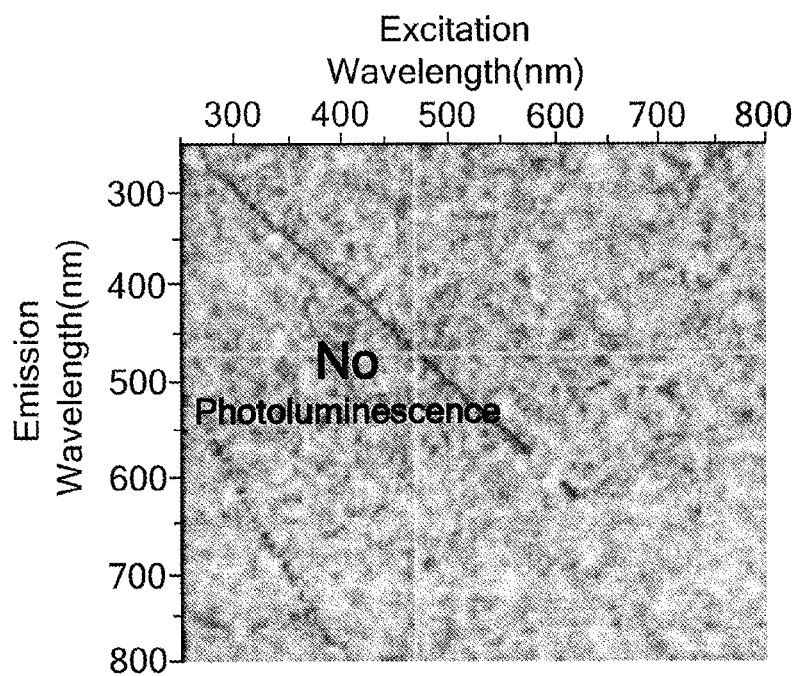
FIG. 10B is a graphical combination of the light absorbance and emission characteristics of a [(AP-SWNH)/SDS] system depicting the absence of luminescence.

A charged nanostructured material with polar molecules 62 applied by dispersion of the nanostructured material in a solution of the polar molecule 44 was prepared according to the teachings of the present disclosure using single walled nanohorns with carboxylic acid functionality (SWNH-COOH) and sodium dodecyl sulphate (SDS) as the polar molecules. The combination of the absorption spectrum for [(SWNH-COOH)/SDS] and emission spectrum of [(SWNH-COOH)/SDS] exhibit a relatively strong area associated with photoluminescence 67 as shown in FIG. 10A. This example demonstrates that single walled nanohorns charged with carboxylic acid functionality and subsequently dispersed in a polar SDS medium to cause the polar molecules to be applied to the surface of the charged nanohorns and compensate for the charge on said surface, exhibits photoluminescence.

In comparison, the single walled nanohorns (SWNH) in the absence of a charged surface do not exhibit any photoluminescence 67 when dispersed in the polar molecules (SDS). Thus this example demonstrates that photoluminescence does not occur for a nanostructured material without a charged surface even when dispersed with polar molecules. Thus the combination of the charged surface of the nanostructured material and the compensation of said charge by the polar molecules applied on the surface of the nanostructured material induces the occurrence of photoluminescence at the isolated regions or luminescent centers.

Example 5

Photoluminescence of [(AC-COOH)/PEG] and [(AC-COOH)/PEI]

Figure 11A:
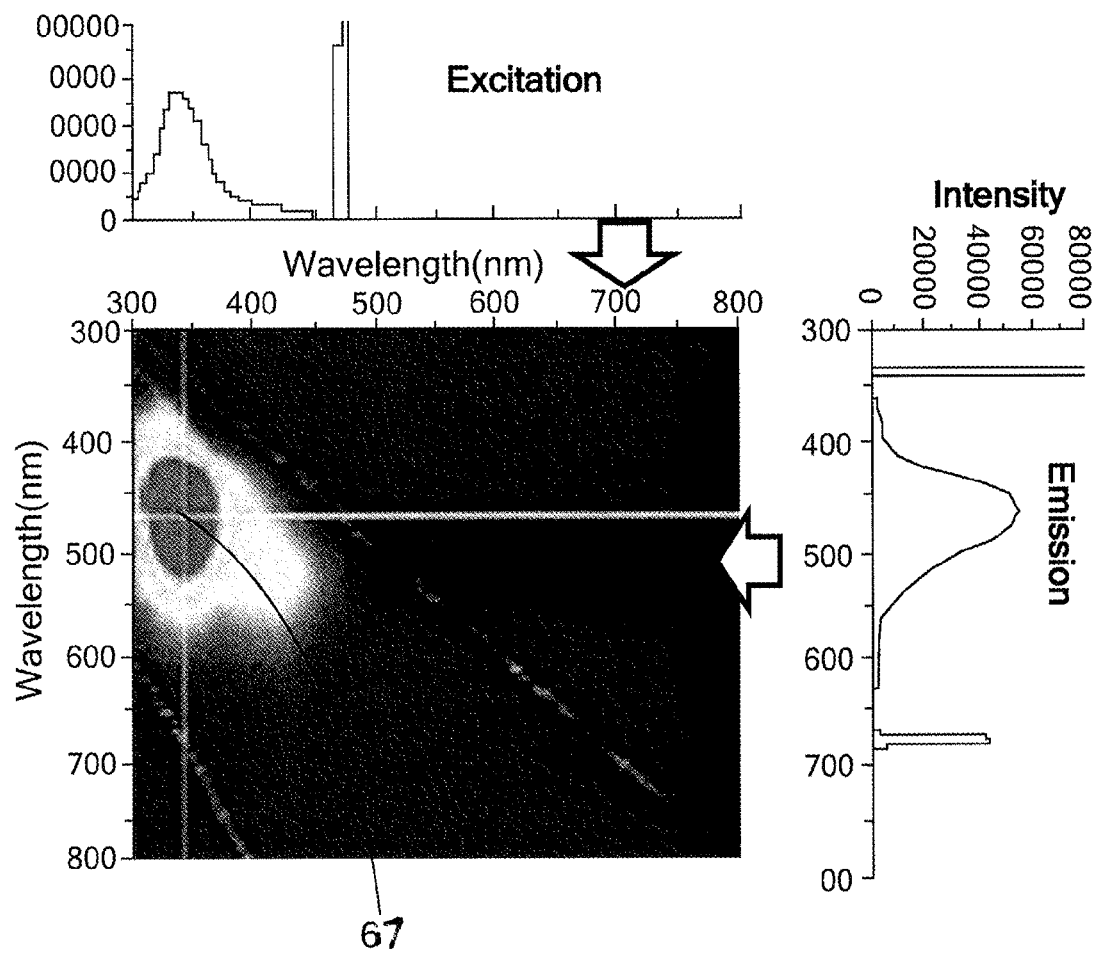
FIG. 11A is a graphical combination of the light absorbance and emission characteristics of an [(amorphous carbon-COOH)/PEG] system prepared according to one aspect of the present disclosure depicting the occurrence of luminescence.
Figure 11B:
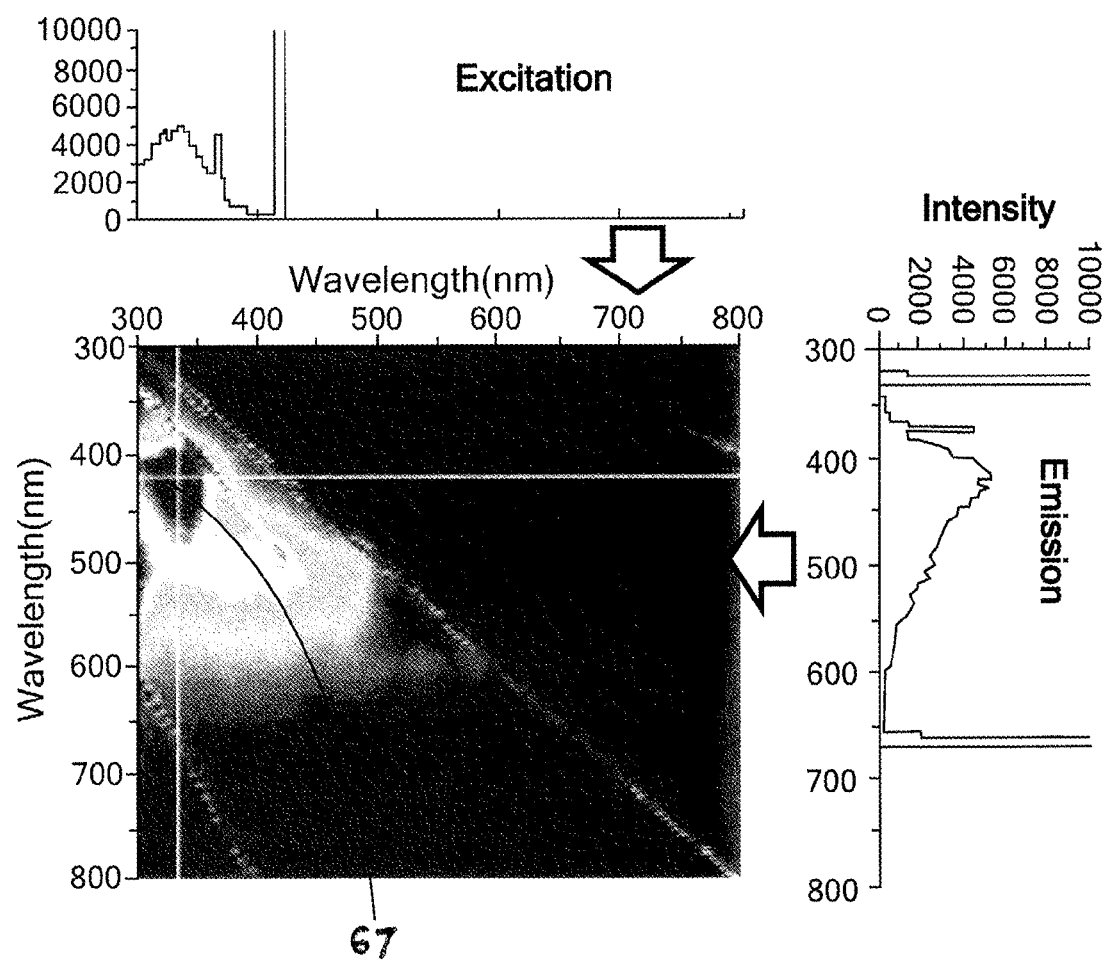
FIG. 11B is a graphical combination of the light absorbance and emission characteristics of an [(amorphous carbon-COOH)/PEI] system prepared according to one aspect of the present disclosure depicting the occurrence of luminescence.

A charged nanostructured material with polar molecules 62 applied by dispersion of the nanostructured material in a solution of the polar molecule 44 was prepared according to the teachings of the present disclosure using amorphous carbon with carboxylic acid functionality (AC-COOH) and either polyethylene glycol, PEG (FIG. 11A) or polyethyleneimine, PEI (FIG. 11B) as the polar molecules. The combination of the absorption spectrum for [(AC-COOH)/PEG] and [(AC-COOH)/PEI] and emission spectrum of [(AC-COOH)/PEG] and [(AC-COOH)/PEI] exhibit a relatively strong area associated with photoluminescence 67 as shown in FIGS. 11A and 11B, respectively. This example demonstrates that amorphous carbon charged with carboxylic acid functionality and subsequently dispersed in a polar PEG or PEI medium to cause the polar molecules to be applied to the surface of the charged nanostructured material and compensate for the charge imbalance on said surface, exhibits photoluminescence.

Example 6

Photoluminescence of [(s-SWNT-COOH)/PEI]

Figure 12:
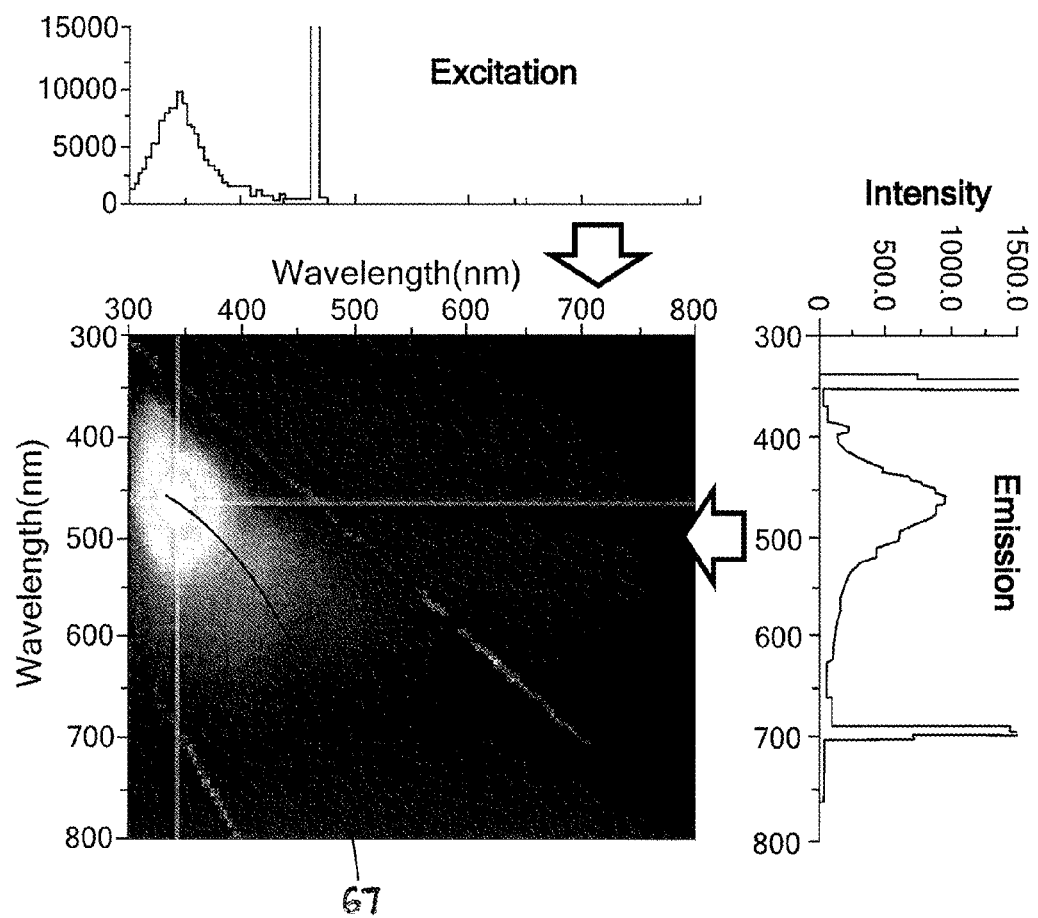
FIG. 12 is a graphical combination of the light absorbance and emission characteristics of a semiconducting [(s-SWNH-COOH)/PEI] system prepared according to one aspect of the present disclosure depicting the occurrence of luminescence.

A charged nanostructured material with polar molecules 62 applied by dispersion of the nanostructured material in a solution of the polar molecule 44 was prepared according to the teachings of the present disclosure using semiconducting single walled nanohorns with carboxylic acid functionality (s-SWNH-COOH) and polyethyleneimine (PEI) as the polar molecules. The combination of the absorption spectrum for [(s-SWNH-COOH)/PEI] and emission spectrum of [(s-SWNH-COOH)/PEI] exhibit a relatively strong area associated with photoluminescence 67 as shown in FIG. 12. This example demonstrates that semiconducting single walled nanohorns charged with carboxylic acid functionality and subsequently dispersed in a polar PEI medium to cause the polar molecules to be applied to the surface of the charged nanohorns and compensate for the charge imbalance on said surface, exhibits photoluminescence.

The above examples demonstrate that acid treated nanostructured materials (e.g., SWNH, amorphous carbon, etc.) dispersed in polar molecules (e.g., PEG, PEI, SDS, etc.) according to the teachings of the present disclosure will exhibit luminescence. A nanostructured material that is dispersed in polar molecules without having a charged surface does not exhibit a luminescent effect. The polar molecules by themselves also do not exhibit a luminescent effect. The wavelength at which the luminescent systems prepared according to the teachings of the present disclosure emit light is dependent upon the composition of the charged nanostructured material and the polar molecules.

A person skilled in the art will recognize that the measurements described are standard measurements that can be obtained by a variety of different test methods. The test methods described in the examples and throughout the disclosure represent only one available method to obtain each of the required measurements.

The foregoing description and disclosure of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of making a planar-like electroluminescent system, the method comprising the steps of:
    providing a nanostructured material in a planar-like structure having a surface; and
    modifying the surface using a lithographic process, the lithographic process:
        creating at least one isolated region and a surface charge imbalance; and
        applying at least one polar molecule to the surface; the polar molecule adapted to compensate for the charge imbalance;
    wherein compensation of the charge imbalance allows the isolated region to exhibit luminescence, thereby forming a luminescent center.

2. The method of claim 1, wherein the step of applying polar molecules to the surface includes aligning the polar molecules on the surface.

3. The method of claim 2, wherein the step of aligning the polar molecules involves a charge alignment mechanism.

4. The method of claim 1, wherein the step of modifying the surface to create an isolated region involves one selected from the group of acid etching the surface and functionalizing the surface with charged groups.

5. The method of claim 1, wherein the step of applying polar molecules to the surface involves one selected from the group of immersing the nanostructured material into a liquid solution comprising the polar molecules and applying the polar molecules as part of a coating to the surface of the nanostructured material.

6. The method of claim 5, wherein immersing the nanostructured material involves the use of a liquid solution that includes one selected from the group of polyethylene glycol (PEG), polyethyleneimine (PEI), and sodium dodecyl sulphate (SDS).

7. The method of claim 4, wherein acid etching incorporates carboxylic acid (—COOH) functionality onto the surface.

8. The method of claim 5, wherein the nanostructured material is a carbon nanostructured material and immersing the carbon nanostructured material into a liquid solution further causes an interaction between the carbon nanostructured material and the solution leading to the formation of a positively charged carbon (zig-zag) site.

9. A luminescent system for use in biological markers, sensors, drug delivery, optoelectronics, or energy conversion devices, the system comprising:
    at least one non-luminescent, nanostructured material having a surface; the surface having at least one isolated region and a charge imbalance; the nanostructured material being dispersed in a rigid inorganic matrix, a gel, or a polymer matrix; and
    at least one polar molecule that couples with the surface and is oriented in a predetermined manner;
    wherein the orientation of the polar molecule compensates for the charge imbalance and allows the isolated region to be luminescent.

10. The luminescent system of claim 9, wherein the nanostructured material is one selected from the group of large nanohorns, small nanohorns, single wall nanotubes, multiwall nanotubes, graphene flakes, and combinations or mixtures thereof.

11. The luminescent system of claim 9, wherein the nanostructured material is one selected from the group of boron nitride, amorphous carbon, silicon carbide, and mixtures thereof.

12. The luminescent system of claim 9, wherein the polar molecule is selected as one from the group of polyethylene glycol (PEG), polyethyleneimine (PEI), and sodium dodecyl sulphate (SDS).

13. The luminescent system of claim 9, wherein the polar molecule is one selected from the group of polar surfactants and dispersants.

14. The luminescent system of claim 13, wherein the polar molecule is one selected from the group of polyethylene glycol (PEG), polyethyleneimine (PEI), sodium dodecyl sulphate (SDS), and combinations or mixtures thereof.

15. The luminescent system of claim 9, wherein the charge imbalance on the surface results from the surface being functionalized with carboxylic acid (—COOH) groups.

16. The luminescent system of claim 12, wherein the nanostructured material is a carbon nanostructured material and the surface includes at least one positively charged carbon (zig-zag) site formed by a reaction between the liquid solution and a carbene moiety present on the surface.

17. The luminescent system of claim 16, wherein the surface further includes sigma- and pi-electron pairing proximate to the zig-zag site.

18. The luminescent system of claim 9, wherein the nanostructured material further comprises a conjugated $\pi$ system that allows the photoluminescence to be tunable over a range of about 2.76 eV.

19. The luminescent system of claim 9, wherein the nanostructured material has a size in excess of 100 nanometers.

20. The luminescent system of claim 19, wherein the size of the nanostructured material is greater than 150 nanometers.

21. The luminescent system of claim 9, wherein the isolated region is a large luminescent center including a combination of more than one unit cell.

* * * * *